Dec. 20, 1960     H. F. KLOESS, JR     2,964,808
VEHICLES
Filed Oct. 7, 1958     3 Sheets-Sheet 1
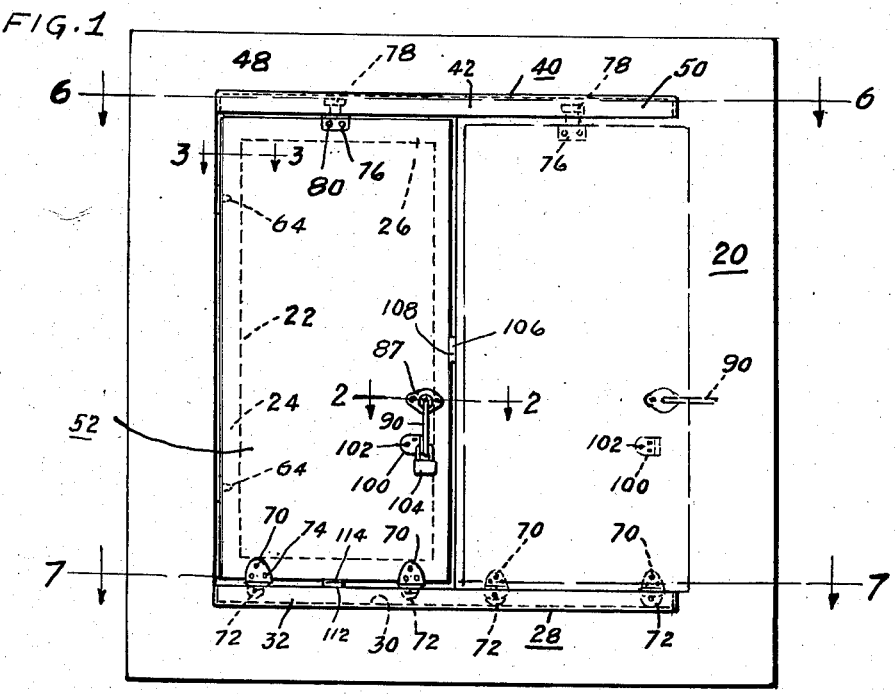
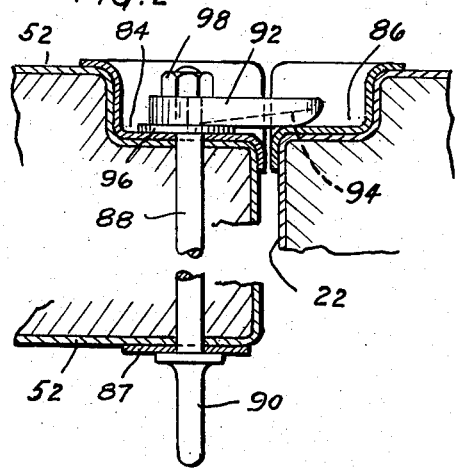
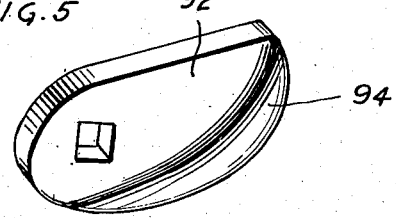
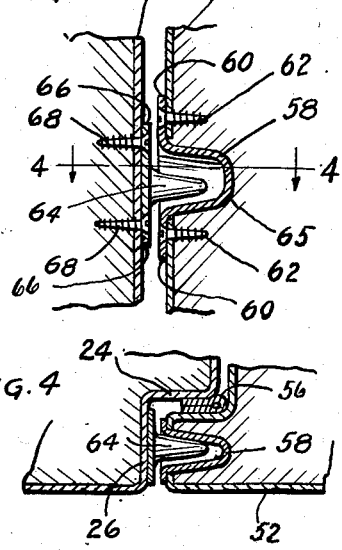
INVENTOR
HENRY F. KLOESS JR.
BY    Ray Eilers
             ATT'Y.

Dec. 20, 1960 H. F. KLOESS, JR 2,964,808
VEHICLES
Filed Oct. 7, 1958 3 Sheets-Sheet 2
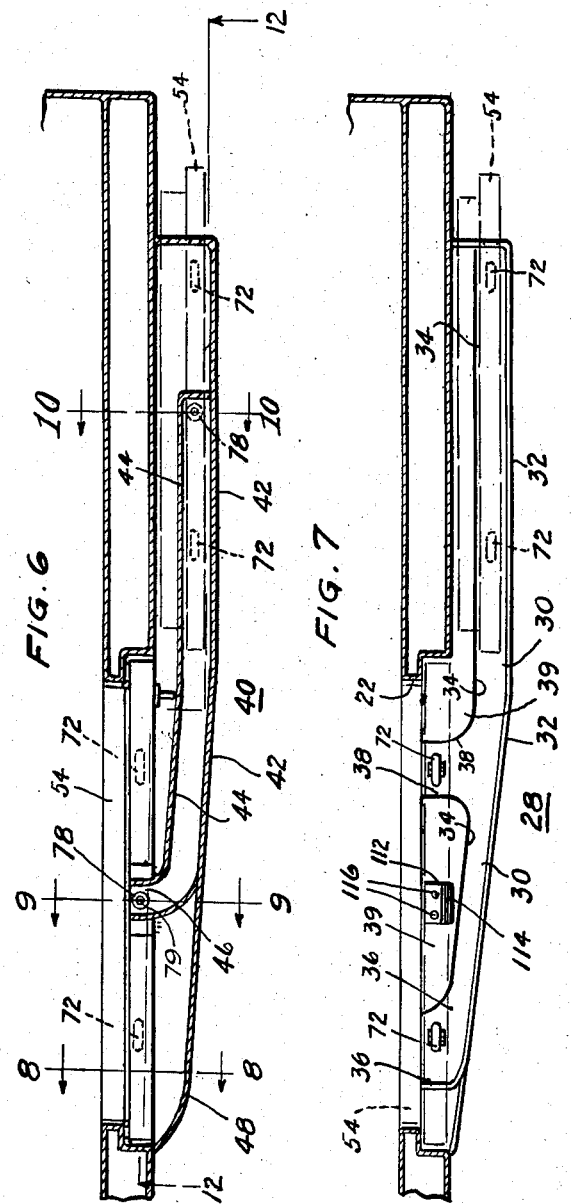
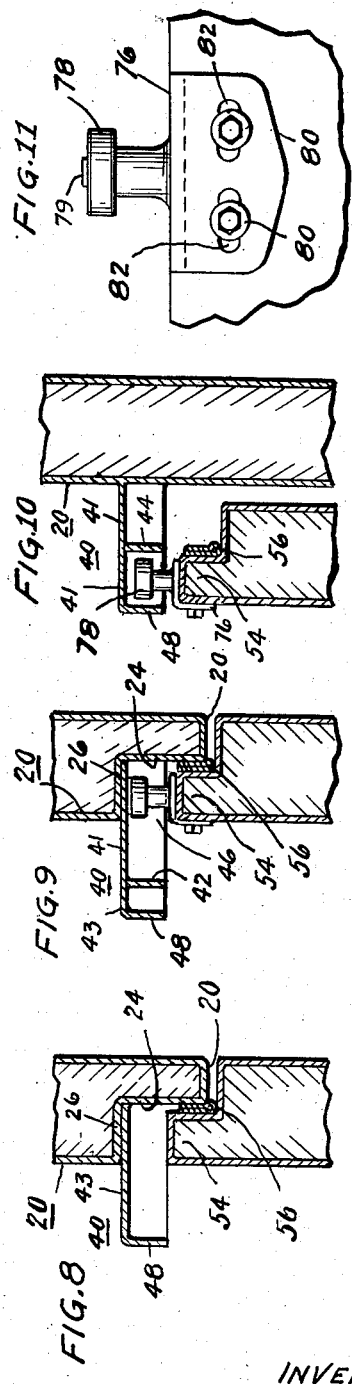
INVENTOR
HENRY F. KLOESS JR.
BY Ray Eilers
ATT'Y.

Dec. 20, 1960    H. F. KLOESS, JR    2,964,808
VEHICLES
Filed Oct. 7, 1958    3 Sheets-Sheet 3
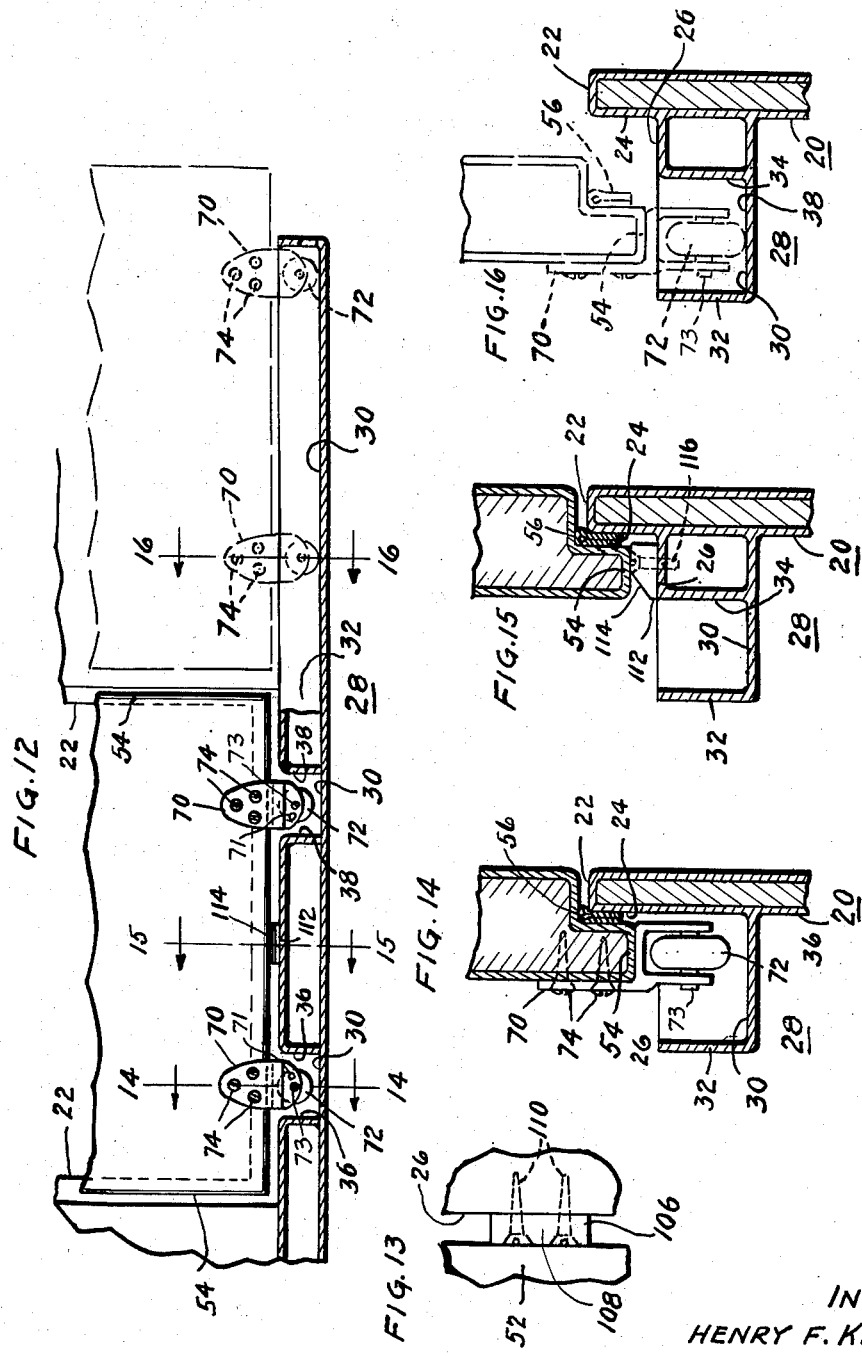
INVENTOR
HENRY F. KLOESS JR.
BY Ray Eilers
ATTY.

United States Patent Office 2,964,808
Patented Dec. 20, 1960

2,964,808

VEHICLES

Henry F. Kloess, Jr., East St. Louis, Ill., assignor to Southwest Truck Body Company, Inc., St. Louis, Mo., a corporation of Missouri Filed Oct. 7, 1958, Ser. No. 765,857

15 Claims. (Cl. 20—23)

This invention relates to improvements in vehicles. More particularly, this invention relates to improvements in doors for vehicles.

It is therefore an object of the present invention to provide an improved door for vehicles.

It is frequently desirable to mount the door of a vehicle so a tight seal can be attained between that door and the door-receiving opening of that vehicle. Where that door is so mounted, little or no dust, dirt or rain can leak into the vehicle around the door, and little or no air can leak out around that door. This minimization or elimination of in-leakage and out-leakage is desirable in most cases, but it is very important where the vehicle is intended to transport refrigerated products. Such products must be protected against all needless exposure to dust, dirt and rain; and any and all loss of cooling effect must be minimized. The present invention provides a door which can be mounted so a tight seal can be attained between that door and the door-receiving opening of a vehicle. It is therefore an object of the present invention to provide a door which can be mounted in the door-receiving opening of a vehicle to seal that opening.

The door provided by the present invention is a step-type door, and it is provided with an outwardly projecting perimetric flange. That outwardly projecting, perimetric flange fits into a perimetric recess adjacent the door-receiving opening of the vehicle and obviates a straight-line path for dust, dirt or rain tending to leak in around the door and also obviates a straight-line path for air tending to leak out around the door. That outwardly projecting, perimetric flange on the door carries a resilient gasket; and that gasket abuts the vertical facing of the perimetric recess, adjacent the door-receiving opening of the vehicle, to form a water-tight seal. Thus, the present invention minimizes or prevents in-leakage and out-leakage by obviating a straight-line leakage path and by providing a resilient, water-tight seal. It is therefore an object of the present invention to provide a step-type door which has an outwardly projecting, perimetric flange with a resilient gasket that can engage, and provide a water-tight seal with the vertical facing of a perimetric recess adjacent the door-receiving opening of a vehicle.

The door provided by the present invention is equipped with rollers that are rotatably supported by anti-friction bearings. The low frictional characteristics of those bearings are desirable because they enable that door to move easily and readily whenever it is desirable to open or close that door. The present invention maintains the desirable low frictional characteristics of those bearings by relieving those bearings of the weight of the door and of dynamic forces and stresses which that door could impart to those bearings if those bearings supported that door while the vehicle was in motion. The present invention does this by providing a pad which supports the weight of the door while the vehicle is in motion. It is therefore an object of the present invention to provide a pad that supports the weight of a door for a vehicle and thereby relieves the anti-friction bearings, for the rollers of that door, from the weight of the door, and from the dynamic forces and stresses which that door could impart to those bearings, while the vehicle is in motion.

The lower edge of the door is enabled to engage and rise upwardly on the pad because the outer face of that pad has a camming surface and because the upper trackway for the door moves the upper part of the door rearwardly as that door moves into position adjacent that pad. Thereafter it is a simple matter to push the door rearwardly and cause it to rise up on the camming surface of the pad.

The present invention provides three-point support for the door of the vehicle, and thereby avoids undesired rocking of that door when that door is held in closed position. The present invention does this by providing two vertically spaced points of support at one side of the door and by providing a vertically intermediate point of support at the opposite side of that door. The two vertically spaced points of support are supplied by two pin and socket assemblies, and the vertically intermediate point of support is supplied by a latch. That latch has an inclined camming surface that draws the said opposite side of the door up tight, and that cooperates with the two pin and socket assemblies to assure full sealing of the door within the door-receiving opening.

The rollers for the door provided by the present invention are mounted externally of that door. That external mounting obviates all need of recessing the door to accommodate those rollers and thereby simplifies the fabrication of that door. Further, the external mounting of that door makes it possible to use the rollers and the brackets for those rollers to space the door from the trackways for the door and thereby protect the surface of the door against marring and scraping. Furthermore, the external mounting of the rollers facilitates the ready insertion of the door into, and the ready removal of the door from, the trackways for the door.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

In the drawing,

Fig. 1 is a front elevational view of a door that is made in accordance with the principles and teachings of the present invention, and of a wall of a vehicle body that has a door-receiving opening to accommodate that door, Fig. 2 is a sectional view, on an enlarged scale, through a portion of that door and through a portion of that wall, and it is taken along the plane indicated by the line 2—2 in Fig. 1.

Fig. 3 is a sectional view, on a still larger scale, through another portion of that door and through another portion of that wall, and it is taken along the plane indicated by the line 3—3 in Fig. 1, Fig. 4 is a sectional view, on the scale of Fig. 3, through the portions of the door and wall shown in Fig. 3, and it is taken along the plane indicated by the line 4—4 in Fig. 3, Fig. 5 is a perspective view, on a scale larger than that of Fig. 2, of the camming dog on the handle for the door of the present invention.

Fig. 6 is a sectional view, on a scale larger than that of Fig. 1, and it is taken along the plane indicated by the line 6—6 in Fig. 1, Fig. 7 is another sectional view, on the scale of Fig. 6, and it is taken along the plane indicated by the line 7—7 in Fig. 1, Fig. 8 is a sectional view, on a scale that is larger than that of Fig. 6, and it is taken along the plane indicated by the line 8—8 in Fig. 6, Fig. 9 is a sectional view, on the scale of Fig. 8, and it is taken along the plane indicated by the line 9—9 in Fig. 6, Fig. 10 is another sectional view, on the scale of Fig. 8, and it is taken along the plane indicated by the line 10—10 in Fig. 6, Fig. 11 is a front elevational view, on a scale larger than that of Fig. 8, and it shows the upper roller for the door provided by the present invention, Fig. 12 is a sectional view on a scale larger than that of Fig. 6, and it is taken along the broken plane indicated by the line 12—12 in Fig. 6, Fig. 13 is a front elevational view, on a scale larger than that of Fig. 12, of a portion of the door and of the wall of the vehicle body, Fig. 14 is a sectional view, on a scale larger than that of Fig. 12, and it is taken along the plane indicated by the line 14—14 in Fig. 12, Fig. 15 is a sectional view, on the scale of Fig. 14, and it is taken along the plane indicated by the line 15—15 in Fig. 12, and Fig. 16 is a sectional view, on the scale of Fig. 14, and it is taken along the plane indicated by the line 16—16 in Fig. 12.

Referring to the drawing in detail, the numeral 20 generally denotes one of the walls of a body for a vehicle; and, in the particular modification shown, that vehicle is an automotive truck. Suitable structure and framing, not shown, strengthen and support the wall 20 and enable that wall to define a door-receiving opening 22. The numeral 24 denotes a vertical facing for a perimetric recess in the wall 20 adjacent the door-receiving opening 22. The two upstanding sections of that facing 24 will preferably be the laterally extending offsets of formed metal posts that are set at opposite sides of the opening 22 and that extend vertically from the top of the body of the vehicle to the bottom of the body of that vehicle. The two horizontal sections of that vertical facing will preferably be vertically extending offsets of formed metal spacers that extend between and are welded to those posts. A second facing 26 coacts with the vertical facing 24 to complete the perimetric recess in the wall 20 of the vehicle. The two upstanding sections of that second facing will preferably be rearwardly extending offsets of the two posts; and the two horizontal sections of that facing will be parts of the upper and lower trackways for the door, as shown by Figs. 8, 9, 15 and 16.

The numeral 28 denotes the lower trackway for the door, and that trackway is suitably secured to the structure and framing, not shown, of the body of the vehicle. That trackway has a horizontally-directed floor 30 which is elongated and narrow and which extends generally parallel to the wall 20. As outermost flange or wall 32 is integral with and projects upwardly from the plane of the floor 30. As indicated particularly by Fig. 7, that flange or wall has a straight, right-hand portion which is parallel to the wall 20, has a short, right-hand end which is perpendicular to that wall, has a straight, left-hand portion which inclines toward the wall 20 at a shallow angle, and has an arcuate portion extending into the plane of that wall. An innermost flange or wall 34 is integral with and projects upwardly from the plane of the floor 30. That innermost flange or wall has portions that are generally parallel to the right-hand and left-hand portions of the outermost flange or wall 32. A recess 36 is provided in the innermost flange 34 adjacent the left-hand end of that flange; and a recess 38 is provided in that flange adjacent the right-hand end of the inclined portion of that flange. The innermost portions of the recesses 36 and 38 extend to the plane defined by the vertical facing 24. The recesses 36 and 38 have floors which are extensions of, and which are coplanar with, the floor 30 of trackway 28. A horizontal wall 39 extends between the top of flange 34 and the wall 20 of the vehicle body, and that horizontal wall merges with and becomes part of the facing 26. A hole, not shown, is provided in the lower trackway 28; and that hole will permit water to drain out of that trackway.

The numeral 40 generally denotes an upper trackway which is suitably secured to the structure and framing, not shown, of the vehicle body. That trackway has a horizontally-directed wall 41 at the top thereof, and it has an outermost wall or flange 42 which depends downwardly from the wall 41. The wall or flange 42 has a straight portion which is parallel to the wall 20, has a straight portion that inclines toward the wall 20 at a shallow angle, and has an arcuate portion that curves into the wall 20 at a right angle. An innermost wall or flange 44 depends downwardly from the wall 41, and that innermost wall or flange is generally parallel to the outermost wall or flange 42. A recess 46 is provided at the left-hand end of the innermost and outermost flanges or walls 44 and 42, respectively, and that recess extends to the plane defined by the facing 24. The wall 41 extends between the tops of the innermost and outermost flanges 34 and 32 and the wall 20 of the vehicle body; and part of that wall merges with and becomes part of the facing 26.

The upper trackway 40 is shorter than the lower trackway 28; and a flange 48 is provided between the left-hand end of flange 42 and the left-hand edge of the door-receiving opening, and a flange 50 is provided between the right-hand end of the flange 42 and a point which corresponds to the right-hand end of the trackway 28. The flanges 48 and 50 provide support for the upper trackway 40 and also improve the appearance of the vehicle. A horizontal wall 43 extends between the tops of the flanges 48 and 50 and the wall 20 of the vehicle body.

The numeral 52 denotes the door for the door-receiving opening 22 in the wall 20, and that door is a step-type door that is generally rectangular in elevation. The door 52 is provided with an outwardly projecting flange 54 that overlies the facing 24, of the perimetric recess adjacent the door-receiving opening 22, whenever that door is in position within that door-receiving opening. That projection coacts with the facings 24 and 26 to obviate a straight line path for leakage. The rear face of the projection 54 carries a resilient gasket 56 which can engage the vertical facing 24 of the perimetric recess, adjacent the door-receiving opening 22, to provide a water-tight seal.

Two sockets 58 are provided with ears 60, as shown by Fig. 3; and those ears have openings which receive the screws 62. The sockets 58 extend inwardly through openings 65 in the left-hand edge of the door 52; and the screws 62 are seated in smaller openings adjacent the openings 65. Two guide pins 64 are provided with ears 66, as shown by Fig. 3; and those ears have openings which receive the screws 68. The guide pins 64 are mounted on the facing 26 at the left-hand side of the door-receiving opening 22, and they project inwardly and overlie part of the vertical facing 24 at that side of that opening. As indicated by Figs. 3 and 4, the sockets and the pins are conical; and the pins 64 can telescope into the sockets 58. The guide pins 64 are so mounted relative to the sockets 58 that they coact with those sockets to hold the left-hand edge of the door 52 immediately adjacent the facing 24 at the left-hand side of the door-receiving opening 22. In doing so, those pins and sockets assure full seating of the gasket 56 against the vertical facing 24 at the left-hand side of the door-receiving opening 22. The sockets 58 have greater vertical dimensions than do the pins 64; and hence those pins can move vertically within those sockets.

The numeral 70 denotes two brackets which have downwardly depending yokes and which have upwardly extending securing portions. The downwardly extending yokes accommodate rollers 72 which are equipped with anti-friction bearings that accommodate fixed pivots 73. The upwardly extending securing portions have openings through them, and those openings accommodate screws 74. Those screws extend through the outer face of the door 52 and fixedly secure the brackets 70 to that door. The brackets hold the rollers 72 so their paths of movement are parallel to the plane of the outer face of the door 52.

The numeral 76 denotes a bracket which has an upwardly extending yoke and which has a downwardly securing portion. That yoke has a fixed pivot 79 and that pivot supports an anti-friction bearing which rotatably supports a roller 78. The securing portion of the bracket 76 has horizontally directed slots 82 which accommodate the screws 80. Those screws extend through the outer face of the door 52 and suitably secure the bracket 76 to that door. The bracket 76 holds the roller 78 for rotation about a vertical axis, whereas the brackets 70 hold the rollers 72 for rotation about horizontal axes. The horizontally-directed slots 82 facilitate the adjustment of the position of the bracket 76 on the top edge of the door 52.

The roller 78 is larger in diameter than the bracket 76 is thick. The brackets 70 have smooth rear faces and have spherical protuberances 71 at the front faces thereof. Those protuberances are thicker than are the heads of the pivots 73. The roller 78 is disposed between the innermost and outermost flanges 44 and 42 of the upper trackway 40, and the yokes of the brackets 70 are disposed between the innermost and outermost flanges 34 and 32 of the lower trackway 28; and that roller and those brackets space the top and bottom edges of the door 52 from those trackways. In doing so, that roller and those brackets protect the door 52 from scratching and marring.

The door 52 is provided with a generally rectangular recess 84 in the rear face thereof and that recess is adjacent the right-hand edge of that door. That recess is adjacent a generally rectangular recess 86 in the inner surface of the wall 20; and the recess 86 is adjacent the right-hand side of the door-receiving opening 22. A faceplate 87 is mounted at the outer face of the door 52 and that faceplate is in general registry with the recess 84 in the rear face of that door. The face-plate 87 and the recess 84 have alined openings therein, and those openings accommodate the rearwardly-extending portion 88 of a handle 90. That rearwardly-extending portion is square-faced, and it is at ninety degrees to the portion which can be grasped by the operator's hand. The square-faced portion 88 extends into a square opening in a dog 92, and that dog has an inclined camming face 94. That camming face is shown by Fig. 5, and it coacts with the inner surface of the recess 86 to pull the door 52 rearwardly. A washer 96 is interposed between the dog 92 and the inner surface of the recess 84, and a nut 98 is fixedly held by threads at the rear end of the square-faced portion 88 of the handle 90.

The outer portion of the handle 90 has an opening through it, and that opening can be set in registry with and immediately adjacent an opening in an L-shaped bracket 100. That bracket is secured to the outer face of the door 52 below, and slightly to the left of, the faceplate 97 by screws 102 which extend through openings in the bracket 100 and in the outer face of the door 52. The opening in the handle 90 and the corresponding opening in the L-shaped bracket 100 accommodate the hasp of a lock 104.

The numeral 106 denotes a pad of sturdy material which has a slippery feel; and one such material is the plastic material known as nylon. That pad has an inclined camming face 108 at that edge thereof which is adjacent the outer face of the wall 20. Countersunk openings are provided in the pad 106; and those openings receive fasteners 110 which extend into the facing 26 at the right-hand side of the door-receiving opening 22 and which fixedly secure the pad 106 in position. That pad is shown by Fig. 13; and it is located intermediate the top and bottom of the right-hand side of the door-receiving opening 22, as shown by Fig. 1.

The numeral 112 denotes a generally similar pad which is made of the same material; and that pad has an inclined camming face 114. Countersunk openings are provided in the pad 112, and those openings accommodate screws 116 which extend through the bottom part of the facing 26 and rigidly secure the pad 112 to that facing. The pad 112 is dimensioned so the lower part of its camming face 114 is below the level of the bottom edge of the flange 54 of door 52 whenever that door is resting on the rollers 72. The upper end of the camming face 114 of pad 112 is located far enough above the lower edge of the camming face 114 so the rollers 72 are lifted up out of engagement with the bottoms of the recesses 36 and 38 whenever the door 52 is moved into closed position. When the door 52 is in closed position, the rollers 72 are in the position shown by Fig. 14; and when that door is in open position, the rollers 72 rest upon the floor 30 of the lower trackway 28, as shown by Fig. 16.

The pad 106 is dimensioned so it holds the flange 54 at the right-hand edge of the door 52 away from the facing 26 at the right-hand side of the door-receiving opening 22. In doing so, that pad holds the sockets 58 fully telescoped over the guide pins 64.

Whenever the door 52 is in closed position, the sockets 58 telescope over the guide pins 64 at the left-hand side of the door-receiving opening 22, and the rear portions of those sockets abut the rear portions of those pins, as shown by Fig. 4. This engagement between the sockets 58 and the pins 64 solidly holds that portion of the gasket 56 at the left-hand side of the door 52 in sealing engagement with that section of the facing 24 at the left-hand side of the opening 22. Also at that time, the forward face of the dog 92 is in engagement with the inner surface of the recess 86 in the wall 20, as shown by Fig. 2; and that dog holds those portions of the gasket 56 at the top, bottom and right-hand edges of the door 52 in engagement with those sections of the facing 24 at the top, bottom and right-hand sides of the door-receiving opening 22. The flange 54 at the right-hand edge of the door abuts, and is held in intimate engagement with, the pad 106; and the flange 54 at the bottom of the door 52 rests upon and is held by the pad 112. This means that the door 52 is held solidly in closed position at three points of securement, namely, the upper socket and pin assembly, the lower socket and pin assembly, and the dog and recess assembly; and it means that the rollers 72 are wholly free of the weight of the door 52 and of any dynamic forces and stresses that the door 52 could impart to them. The roller 78 is out of engagement with the upper trackway 40 and is also free of forces and stresses that could be imparted to it by the door 52.

When it is desired to open the door, the lock 104 is unlocked and removed, and the handle 90 is grasped and rotated in the counter clockwise direction. Such rotation moves the camming face 94 of the dog 92 relative to the recess 86 and gradually relieves the compressive forces developed within the gasket 56 by the dog 92 during the earlier latching of the handle 90. Once that handle is in the horizontal position indicated by dotted lines in Fig. 1, the operator can pull outwardly on that handle; and thereupon the roller 78 will move outwardly through the passage 46, and the rollers 72 will move outwardly through the recesses 36 and 38. The socket and pin assemblies at the left-hand edge of the door 52 will act as pivots for that door and hence the roller 78 will move further outwardly than will the roller 72 in the recess 36, and the roller 72 in the recess 38 will move further outwardly than will the roller 78. Once the door 52 has been moved to the inclined position shown by dotted lines at the left-hand side of Fig. 7, the operator need only apply a pull to the right on the handle 90. The arcuate surface at the right-hand side of the recess 38 will urge the right-hand roller 72 outwardly if it is not in full outward position. As the door 52 moved outwardly from its closed position to the inclined position shown at the left-hand side of Fig. 7, that door moved downwardly off of the pad 112, and that downward movement acted through the camming surface 114 on the pad 112 to apply an outwardly directed force to the door 52. As the door 52 moved downwardly, the rollers 72 came to rest upon the bottom 30 of the lower trackway 28; and, as a result, the right-hand pull applied to the handle 90 will enable the door 52 to move easily to the right.

The anti-friction bearings which support the rollers 72 and 78 minimize the force which must be applied to the handle 90 to cause the door 52 to move to the right; and consequently, the door moves easily and readily. As the door moves to the right, the roller 78 is guided by the innermost and outermost flanges 44 and 42, and the brackets 70 for the rollers 72 are guided by the innermost and outermost flanges 32 and 34. The rear faces of the brackets 70 serve as bearing surfaces when they engage the innermost flange 34, and the spherical protuberances 71 serve as bearing surfaces when they engage the outermost flange 32.

The inclined portions of the lower and upper trackways 28 and 40 respectively, cause the door 52 to move outwardly of the wall 20, as shown by Figs. 6 and 7. Consequently, that door will not rub against and mar the surface of the wall 20. When in open position, the door 52 is guided and steadied by the rollers 72, the brackets 70, the roller 78 and the bracket 76.

After the desired items have been placed in or removed from the vehicle body, the door 52 can be closed. In closing the door 52 it is only necessary to apply a left-hand pull to the handle 90; and thereupon that door will be guided by the upper and lower trackways 40 and 28, respectively, until the sockets 58 telescope over the pins 64. In particular, the inclined portions of the walls 32 and 34 of the lower trackway 28 successively move the rollers 72 toward the wall 20 as they move the door 52 to the left, and the inclined portions of the walls 42 and 44 of the upper trackway 40 move the roller 78 toward the wall 20 as the door 52 moves to the left. The conical configurations of the sockets 58 and of the pins 64 center the left-hand edge of the door 52 on those pins and provides full guidance and support for the left-hand edge of that door. As the door 52 approaches the extreme left-hand limit of movement of the door 52, the arcuate portion of the flange 42 forces the roller 78 to move the top of the door 52 sharply inward; and as that top moves inwardly, the bottom of the door will engage and start to ride up on the camming surface 114 on the pad 112. The operator then need only push inwardly on the handle 90; and that push will enable the camming surfaces 108 and 114 on the pads 106 and 112, respectively, to shift the door 52 fully to the left and to raise the weight of that door up off of the rollers 72. The final force needed to close the door and to compress the gasket 56 is applied by the camming face 94 on the dog 92. That closing force is attained easily by rotating the handle 90 in the clockwise direction from horizontal position to the vertical position, shown by solid lines in Fig. 1. In this simple and easy way, the door 52 is precisely moved to closed position and the forces on the rollers 72 and 78 are relieved.

The recesses 84 and 86 are desirable because they enable the dog 92 to rotate between locking and unlocking positions without contacting any of the contents of the vehicle body. Consequently, the vehicle body can be filled completely and the door 52 can be set and locked in closed position without any injury to the contents of the vehicle body.

The door 52 can easily be separated from the upper and lower trackways 40 and 28. This is most easily done by removing the screws 80 from the slots 82 of the bracket 76, and then separating that bracket from the door 52. Thereupon, the top of the door 52 can be tilted outwardly from under the upper trackway 40, and then the door can be lifted bodily upwardly to free it from the lower trackway 28.

Whereas the drawing and accompanying description have shown and described a preferred embodiment of the present invention, it should be apparent to those skilled in the art that various changes may be made in the form of the invention without affecting the scope thereof.

What I claim is:

1. A vehicle having a wall that defines a door-receiving opening, a vertical facing adjacent said door-receiving opening, a second facing that is disposed at an angle to said vertical facing and that coacts with said vertical facing to define a perimetric recess in said wall of said vehicle adjacent said door-receiving opening, guide pins that are carried by that portion of said second facing which is adjacent one side of said door-receiving opening, a recess in the wall of said vehicle adjacent said opposite side of said door-receiving opening, a pad, an upper trackway that is secured to said vehicle and that has part thereof disposed adjacent the top of said door-receiving opening, said upper trackway having an innermost wall and an outermost wall, each of said walls of said upper trackway having a straight portion that is generally parallel to but is disposed outwardly of said wall of said vehicle, each of said walls of said upper trackway having a straight portion that is inclined relative to said wall of said vehicle, a recess in said upper trackway, a lower trackway that is secured to said vehicle and that has part thereof disposed adjacent the bottom of said door-receiving opening, said lower trackway having an innermost wall and an outermost wall that project upwardly from the plane of said floor, each of said walls of said lower trackway having a straight portion that is generally parallel to but is disposed outwardly of said wall of said vehicle, each of said walls of said lower trackway having a straight portion that is inclined relative to said wall of said vehicle, a pair of recesses in said lower trackway, said recesses in said lower trackway being oppositely disposed of said recess in said upper trackway, a step-type door with an outwardly-projecting perimetric flange that is complementary to and is disposable within said perimetric recess in said wall of said vehicle, a resilient gasket that is disposed at the rear face of said outwardly-projecting perimetric flange of said door and that is engageable with said vertical facing to provide a water-tight seal, brackets that have downwardly extending yokes, said yokes of said brackets underlying the bottom of said door and having pivots that support anti-friction bearings which rotatably carry rollers, said pivots being horizontally-directed and holding said rollers so the paths of movement of said rollers are parallel to the outer face of said door, one of said brackets and rollers being dimensioned to fit within one of said recesses in said lower trackway, another of said brackets and rollers being dimensioned to fit within the other of said recesses in said lower trackway, a further bracket that has a pivot, an anti-friction bearing that is supported by said pivot on said further bracket and that supports a further roller, said further roller being confined by and being selectively engageable with said walls of said upper trackway and being dimensioned to fit within said recess in said upper trackway, the top edge of said door being wholly below and out of engagement with said walls of said upper trackway, the bottom edge of said door being wholly above and out of engagement with said walls of said lower trackway, sockets in that edge of said outwardly-projecting perimetric flange of said door which is disposable adjacent that portion of said second facing which is adjacent said one side of said door-receiving opening, said sockets having greater vertical dimensions than do said guide pins whereby said sockets and said door can move vertically relative to said pins while said sockets are telescoped over said pins, said door following said paths of movement to move into and out of register with said door-receiving opening and moving transversely of said paths of movement to move into position within said door-receiving opening, said pad being interposed between the bottom of said door and the bottom of said door-receiving opening whenever said door is in position within said door-receiving opening, the first said rollers being so dimensioned that the distance between the bottom edge of said door and the bottoms of said rollers is smaller than the distance between the floor of said lower trackway and said bottom edge of said door whenever said door is in position within said door-receiving opening and said pad is interposed between said bottom of said door and said bottom of said door-receiving opening, whereby said bottom edge of said door can be raised upwardly and said pad can be interposed between said bottom of said door and said bottom of said door-receiving opening to relieve the first said rollers of the weight of said door, said upper trackway and said lower trackway guiding said further roller and the first said brackets, and theresby guiding said door, toward and away from said door-receiving opening and said recesses in said upper and lower trackways, a recess in the inner face of said door that is adjacent said recess in the wall of said vehicle, and a handle that has a dog disposed in said recess in said inner face of said door, said pins and said sockets coacting to hold that edge of said door which is adjacent said one side of said door-receiving opening in gasket-compressing relation with that portion of said vertical facing which is adjacent said one side of said door-receiving opening, said dog coacting with said recess in said wall of said vehicle to hold the opposite edge of said door in gasket-compressing relation with that portion of said vertical facing which is adjacent said opposite side of said door-receiving opening.

2. A vehicle having a wall that defines a door-receiving opening, a vertical facing adjacent said door-receiving opening, a second facing that is disposed at an angle to said vertical facing and that coacts with said vertical facing to define a perimetric recess in said wall of said vehicle adjacent said door-receiving opening, an upper trackway that is secured to said vehicle and that has part thereof disposed adjacent the top of said door-receiving opening, said upper trackway being generally U-shaped in cross section and having an innermost wall and an outermost wall that are generally parallel, each of said walls of said upper trackway having a straight portion that is generally parallel to but is disposed outwardly of said wall of said vehicle, each of said walls of said upper trackway having a straight portion that is inclined relative to said wall of said vehicle, each of said walls of said upper trackway having a rearwardly directed portion that extends toward said wall of said vehicle, said rearwardly directed portions of said walls of said upper trackway extending to the plane defined by said vertical facing to define a recess, a lower trackway that is secured to said vehicle and that has part thereof disposed adjacent the bottom of said door-receiving opening, said lower trackway being generally in register with said upper trackway, said lower trackway being generally U-shaped in cross section and having a floor, said lower trackway having an innermost wall and an outermost wall that project upwardly from the plane of said floor and that are generally parallel, each of said walls of said lower trackway having a straight portion that is generally parallel to but is disposed outwardly of said wall of said vehicle, each of said walls of said lower trackway having a straight portion that is inclined relative to said wall of said vehicle, each of said walls of said lower trackway having a rearwardly directed portion that extends toward said wall of said vehicle, said rearwardly directed portions of said walls of said lower trackway extending to the plane defined by said vertical facing to define a recess, surfaces that extend rearwardly from said innermost wall of said lower trackway to the plane defined by said vertical facing to define a second recess in said lower trackway, said recesses in said lower trackway being oppositely disposed of said recess in said upper trackway, said recesses in said lower trackway having floors that extend rearwardly from and are co-planar with said floor of said lower trackway, said second recess in said lower trackway being adjacent the junction between said straight portions of said innermost wall of said lower trackway, a step-type door with an outwardly-projecting perimetric flange that is complementary to and is disposable within said perimetric recess in said wall of said vehicle, brackets that have downwardly extending yokes, said yokes of said brackets underlying the bottom of said door and having pivots that support anti-friction bearings which rotatably carry rollers, said brackets having smooth rear faces that extend below the top of said innermost wall of said lower trackway and are confined by said innermost wall of said lower trackway and that can engage and bear against said innermost wall of said lower trackway, said brackets having spherical protuberances on the front faces thereof that are confined by said outermost wall of said lower trackway and that can engage and bear against said outermost wall of said lower trackway, one of said brackets and rollers being dimensioned to fit within the first said recess in said lower trackway, another of said brackets and rollers being dimensioned to fit within said second recess in said lower trackway, a further bracket that has a pivot, and an anti-friction bearing that is supported by said pivot on said further bracket and that supports a further roller, said further roller being confined by and being selectively engageable with said walls of said upper trackway and being dimensioned to fit within said recess in said upper trackway, the top edge of said door being wholly below and out of engagement with said walls of said upper trackway, the bottom edge of said door being wholly above and out of engagement with said walls of said lower trackway, said upper trackway and said lower trackway guiding said further roller and the first said brackets, and thereby guiding said door, toward and away from said door-receiving opening and said recesses in said upper and lower trackways.

3. A vehicle having a wall that defines a door-receiving opening, a vertical facing adjacent said door-receiving opening, a second facing that is disposed at an angle to said vertical facing and that coacts with said vertical facing to define a perimetric recess in said wall of said vehicle adjacent said door-receiving opening, an upper trackway that is secured to said vehicle and that has part thereof disposed adjacent the top of said door-receiving opening, said upper trackway being generally U-shaped in cross section and having an innermost wall and an outermost wall that are generally parallel, each of said walls of said upper trackway having a straight portion that is generally parallel to but is disposed outwardly of said wall of said vehicle, each of said walls of said upper trackway having a straight portion that is inclined relative to said wall of said vehicle, each of said walls of said upper trackway having a rearwardly directed portion that extends toward said wall of said vehicle, said rearwardly directed portions of said walls of said upper trackway extending to the plane defined by said vertical facing to define a recess, a lower trackway that is secured to said vehicle and that has part thereof disposed adjacent the bottom of said door-receiving opening, said lower trackway being generally in register with said upper trackway, said lower trackway being generally U-shaped in cross section and having a floor, said lower trackway having an innermost wall and an outermost wall that project upwardly from the plane of said floor and that are generally parallel, each of said walls of said lower trackway having a straight portion that is generally parallel to but is disposed outwardly of said wall of said vehicle, each of said walls of said lower trackway having a straight portion that is inclined relative to said wall of said vehicle, each of said walls of said lower trackway having a rearwardly directed portion that extends toward said wall of said vehicle, said rearwardly directed portions of said walls of said lower trackway extending to the plane defined by said vertical facing to define a recess, surfaces that extend rearwardly from said innermost wall of said lower trackway to the plane defined by said vertical facing to define a second recess in said lower trackway, said recesses in said lower trackway being oppositely disposed of said recess in said upper trackway, said recesses in said lower trackway having floors that extend rearwardly from and are co-planar with said floor of said lower trackway, said second recess in said lower trackway being adjacent the junction between said straight portions of said innermost wall of said lower trackway, a step-type door with an outwardly-projecting perimetric flange that is complementary to and is disposable within said perimetric recess in said wall of said vehicle, and rollers carried by said door, said rollers being disposed within and confined by said upper and lower trackways.

4. A vehicle having a wall that defines a door-receiving opening, a vertical facing adjacent said door-receiving opening, a second facing that is disposed at an angle to said vertical facing and that coacts with said vertical facing to define a perimetric recess in said wall of said vehicle adjacent said door-receiving opening, conical guide pins that are set at different levels and that are carried by that portion of said second facing which is adjacent one side of said door-receiving opening, a step-type door with an outwardly-projecting perimetric flange that is complementary to and is disposable within said perimetric recess in said wall of said vehicle, a resilient gasket that is disposed at the rear face of said outwardly-projecting perimetric flange of said door and that is engageable with said vertical facing to provide a water-tight seal, conical sockets in that edge of said outwardly-projecting perimetric flange of said door which is disposable adjacent that portion of said second facing which is adjacent said one side of said door-receiving opening, said sockets telescoping over said conical pins whenever said door is within said door-receiving opening, said sockets having greater vertical dimensions than do said conical pins whereby said sockets and said door can move vertically relative to said pins while said sockets are telescoped over said pins, said pins and said sockets coacting to hold the first said edge of said door in gasket-compressing relation with that portion of said vertical facing which is adjacent said one side of said door-receiving opening, the opposite side of said door urging said door toward said one side of said door-receiving opening and thereby urging said sockets into telescoping relation with said pins whenever said sockets are not in full telescoping relation with said pins as said opposite side of said door door is moved into said door-receiving opening.

5. A vehicle having a wall that defines a door-receiving opening, pins that are secured adjacent one side of said door-receiving opening, a pad, a camming surface on said pad, said pad being of a sturdy material that has a slippery feel, a trackway that is secured to said vehicle adjacent the bottom of said door-receiving opening, said lower trackway having a floor, a door that is disposable in register with said door-receiving opening, and is movable laterally into position within said door-receiving opening, said pad being interposed between the bottom of said door and the bottom of said door-receiving opening and spacing the bottom of said door above the bottom of said door-receiving opening whenever said door is in position within said door-receiving opening, rollers mounted on said door and engageable with said floor of said trackway, sockets in that edge of said door which is disposable adjacent said one side of said door-receiving opening, said sockets telescoping over said pins whenever said door is in register with said door-receiving opening, said sockets having greater vertical dimensions than do said pins whereby said sockets and said door can move vertically relative to said pins while said sockets are telescoped over said pins, said rollers being dimensioned so that the distance between the bottom edge of said door and the bottoms of said rollers is less than the distance between said floor of said lower trackway and said bottom edge of said door whenever said door is in position within said door-receiving opening, said door being adapted to be raised upwardly by said camming surface on said pad to relieve said rollers of the weight of said door, said pins and said sockets coacting to hold the first said edge of said door fixed relative to said one side of said door-receiving opening whenever said door is within said door-receiving opening.

6. A vehicle having a wall that defines a door-receiving opening, pins that are secured adjacent one side of said door-receiving opening, a pad, a trackway that is secured to said vehicle adjacent the bottom of said door-receiving opening, said lower trackway having a floor, a door that is disposable in register with said door-receiving opening and is movable laterally into position within said opening, said pad being interposed between the bottom of said door and the bottom of said door-receiving opening and spacing the bottom of said door above the bottom of said door-receiving opening whenever said door is in position within said door-receiving opening, rollers mounted on said door and engageable with said floor of said trackway, sockets in that edge of said door which is disposable adjacent said one side of said door-receiving opening, said sockets telescoping over said pins whenever said door is in register with said door-receiving opening, said sockets having greater vertical dimensions than do said pins whereby said sockets and said door can move vertically relative to said pins while said sockets are telescoped over said pins, said rollers being dimensioned so that the distance between the bottom edge of said door and the bottoms of said rollers is smaller than the distance between said floor of said lower trackway and the bottom edge of said door whenever said door is in position within said door-receiving opening, whereby said bottom edge of said door can be raised upwardly to enable said pad to hold said bottom edge of said door in raised position and thereby relieve said rollers of the weight of said door, said pins and said sockets coacting to hold the first said edge of said door fixed relative to said one side of said door-receiving opening whenever said door is in position within said door-receiving opening.

7. A vehicle having a wall that defines a door-receiving opening, a vertical facing adjacent said door-receiving opening, a second facing that is disposed at an angle to said vertical facing and that coacts with said vertical facing to define a perimetric recess in said wall of said vehicle adjacent said door-receiving opening, conical pins that are carried by that portion of said second facing which is adjacent one side of said door-receiving opening, a recess in the wall of said vehicle adjacent the opposite side of said door-receiving opening, a step-type door with an outwardly-projecting perimetric flange that is complementary to and is disposable within said perimetric recess in said wall of said vehicle, a resilient gasket that is disposed at the rear face of said outwardly-projecting perimetric flange of said door and that is engageable with said vertical facing to provide a water-tight seal, conical sockets in that edge of said outwardly-projecting perimetric flange of said door which is disposable adjacent that portion of said second facing that is adjacent said one side of said door-receiving opening, said sockets telescoping over said pins whenever said door is within said door-receiving opening, a recess in the inner face of said door that is adjacent said recess in the wall of said vehicle, and a handle that has a dog disposed in said recess in said inner face of said door, said dog having a camming face that is engageable with said recess in said wall of said vehicle, said pins and said sockets coacting to hold one side of said door in gasket-compressing relation with that portion of said vertical facing which is adjacent said one side of said door-receiving opening, said camming surface on said dog coacting with said recess in said wall of said vehicle to hold the other sides of said door in gasket-compressing relation with the other portions of said vertical facing, said pins and sockets coacting with said dog and said recess in said wall of said vehicle to provide three-point support for said door.

8. A vehicle having a wall that defines a door-receiving opening, pins that are adjacent one side of said door-receiving opening, a recess in the wall of said vehicle adjacent the opposite side of said door-receiving opening, a door disposable in register with said door-receiving opening, sockets in that edge of said door which is disposable adjacent said one side of said door-receiving opening, said sockets telescoping over said pins whenever said door is in register with said door-receiving opening, a recess in the inner face of said door that is adjacent said recess in the wall of said vehicle, and a handle that has a dog disposed in said recess in said inner face of said door, said pins and said sockets coacting to hold one side of said door fixed adjacent said one side of said door-receiving opening, said dog coacting with said recess in said wall of said vehicle to hold the other side of said door fixed adjacent said opposite side of said door-receiving opening, said pins and sockets coacting with said dog and said recess in said wall of said vehicle to provide three-point support for said door.

9. A vehicle having a wall that defines a recessed door-receiving opening, an upper trackway that is secured to said vehicle and that has part thereof disposed adjacent the top of said door-receiving opening, said upper trackway having an innermost wall and an outermost wall, a lower trackway that is secured to said vehicle and that has part thereof disposed adjacent the bottom of said door-receiving opening, said lower trackway having an innermost wall and an outermost wall, a door that is movable longitudinally of said upper and lower trackways to move into and out of register with said door-receiving opening, brackets that are secured to said door and that carry rollers, said rollers being positioned within said upper and lower trackways and coacting with said brackets to hold the upper and lower edges of said door out of engagement with said upper and lower trackways, said rollers being freely movable longitudinally of said upper and lower trackways to enable said door to move freely into and out of register with said door-receiving opening, said upper and lower trackways having wide laterally-directed portions that are adjacent said door-receiving opening and that extend toward said door-receiving opening and that permit said rollers to move laterally of said upper and lower trackways and thereby permit said door to be moved laterally into position within said door-receiving opening, said upper and lower trackways having narrow portions spaced from the door-receiving opening wherein the innermost and outermost walls of said upper and lower trackways prevent appreciable lateral movement of said door whenever said door is out of register with said door-receiving opening, said upper and lower trackways having guiding portions intermediate said wide portions and said narrow portions that direct said rollers into said narrow portions and thereby avoid jamming of said door as said door is moved out of register with said door-receiving opening, and said upper and lower trackways being spaced outwardly from the plane of said wall a distance that keeps said door from moving into engagement with said wall whenever said door is out of register with said door-receiving opening.

10. A vehicle having a wall that defines a recessed door-receiving opening, a pad, a camming surface on said pad, said camming surface on said pad being adjacent one edge of said pad, a trackway that is secured to said vehicle and has part thereof disposed adjacent the bottom of said door-receiving opening, said trackway having a floor, a door that is disposable in register with and is movable laterally and upwardly into position within said door-receiving opening, a surface on said door that is adjacent the bottom of said door and that can be raised upwardly to be disposed above and in register with a surface that is adjacent the bottom of said door-receiving opening, said pad being secured to one of said registrable surfaces and being engageable with the other of said registrable surfaces to raise the said surface on said door upwardly relative to the said surface adjacent the bottom of said door-receiving opening, pivots that are secured to said door and that rotatably carry rollers which can rest upon said floor of said trackway, said pivots being horizontally directed and holding said rollers so the paths of movement of said rollers are parallel to the outer face of said door, said trackway having narrow portions that cause said door to follow said paths of movement as it moves into and out of register with said door-receiving opening and having wide portions that permit said door to move transversely of said paths of movement to move into position within said door-receiving opening, the distance between the said surface on said door and the bottoms of said rollers being greater than the distance between said floor of said trackway and the leading edge of said camming surface on said pad whenever said rollers are resting upon said floor of said trackway but being smaller than the distance between said floor of said trackway and the upper edge of said pad whenever said pad is disposed between said registrable surfaces, whereby said leading edge of said camming surface is engageable with said other registrable surface while said door is resting upon said rollers to facilitate the raising of said door to relieve said rollers of the weight of said door as said door moves transversely of said paths of movement and into position within said door-receiving opening, said narrow portions of said trackway guiding said door for movement in a plane that is spaced outwardly of said wall and is spaced outwardly of all positions of said door wherein said door is supported by said pad, whereby the movement of said door in said plane of movement is not impeded by said pad.

11. A vehicle having a wall that comprises a door-receiving opening, said wall having portions that define a perimetric recess in said wall of said vehicle adjacent said door-receiving opening, an upper trackway that is secured to said vehicle and that has part thereof disposed adjacent the top of said door-receiving opening, said upper trackway having an innermost wall and an outermost wall that are generally parallel, each of said walls of said upper trackway having a straight portion that is generally parallel to but is disposed outwardly of said wall of said vehicle, each of said walls of said upper trackway having a second portion that is inclined relative to said wall of said vehicle, each of said walls of said upper trackway having a rearwardly directed portion that extends toward said wall of said vehicle, said rearwardly directed portions of said walls of said upper trackway extending toward said perimetric recess to define a second recess, a lower trackway that is secured to said vehicle and that has part thereof disposed adjacent the bottom of said door-receiving opening, said lower trackway being generally in register with said upper trackway, said lower trackway having a floor, said lower trackway having an innermost wall and an outermost wall that project upwardly from the plane of said of said floor and that are generally parallel, each of said walls of said lower trackway having a straight portion that is generally parallel to but is disposed outwardly of said wall of said vehicle, each of said walls of said lower trackway having a second portion that is inclined relative to said wall of said vehicle, each of said walls of said lower trackway having a rearwardly directed portion that extends toward said wall of said vehicle, said rearwardly directed portions of said walls of said lower trackway extending toward said perimetric recess to define a third recess, said third recess having a floor that extends rearwardly from said floor of said lower trackway, a step-type door with an outwardly-projecting perimetric flange that is complementary to and is disposable within said perimetric recess in said wall of said vehicle, and rollers carried by said door, said rollers being confined within said upper and lower trackways whenever said door is out of register with said door receiving opening but being movable into said second and third recesses when said door is in register with said door-receiving opening to permit said door to move within said door-receiving opening, said second recess and said third recess permitting said door to tilt relative to said door-receiving opening as said door is moved into position within said door-receiving opening.

12. A vehicle having a wall that comprises a door-receiving opening, said wall having portions that define a perimetric recess in said wall of said vehicle adjacent said door-receiving opening, an upper trackway that is secured to said vehicle and that has part thereof disposed adjacent the top of said door-receiving opening, said upper trackway having an innermost wall and an outermost wall, a second recess that is contiguous to and extends rearwardly from said upper trackway toward said perimetric recess, a lower trackway that is secured to said vehicle and that has part thereof disposed adjacent the bottom of said door-receiving opening, said lower trackway being generally in register with said upper trackway, said lower trackway having a floor, said lower trackway having an innermost wall and an outermost wall that project upwardly from the plane of said floor, further recesses that are contiguous to and extend rearwardly from said lower trackway toward said perimetric recess, a step-type door with an outwardly-projecting perimetric flange that is complementary to and is disposable within said perimetric recess in said wall of said vehicle, and rollers carried by said door, said rollers being confined within said upper and lower trackways whenever said door is out of register with said door-receiving opening but being movable into said second and further recesses when said door is in register with said door-receiving opening to permit said door to move within said door-receiving opening, said second recess and the roller that moves into said second recess being mounted and arranged to start the top of said door moving into said perimetric recess while said lower trackway is holding the other rollers out of said further recesses.

13. A vehicle having a wall that defines a recessed door-receiving opening, conical guide pins that are secured adjacent one side of said door-receiving opening and that are set at different levels, an upper and lower trackway adjacent said door-receiving opening, said trackways being generally U-shaped in cross section and having narrow portions that are spaced away from said door-receiving opening and having wide portions that are in register with said door-receiving opening, a door, rollers that are rotatably carried by said door and that are confined by said upper and lower trackways, said narrow portions of said upper and lower trackways preventing appreciable movement of said door laterally of said upper and lower trackways whenever said door is out of register with said door-receiving opening and thereby positively holding said door out of engagement with said wall whenever said door is out of register with said door-receiving opening but said wide portions of said upper and lower trackways freeing said door for appreciable movement laterally of said trackways whenever said door is in register with said door-receiving opening whereby said door is movable into position within said door-receiving opening and flush with said wall, conical sockets on that side of said door which is adjacent said one side of said door-receiving opening, said sockets telescoping over said guide pins whenever said side of said door has been moved into position within said door-receiving opening and said door is in register with said door-receiving opening, the opposite side of said door coacting with said opposite side of said door-receiving opening to urge said door toward said one side of said door-receiving opening and thereby urge said sockets into full telescoping relation with said pins whenever said sockets are not in full telescoping relation with said pins as said opposite side of said door is moved into position within said door-receiving opening.

14. A vehicle having a wall that defines a door-receiving opening, an upper trackway that is secured to said vehicle and that has part thereof disposed adjacent the top of said door-receiving opening, said upper trackway having an innermost wall and an outermost wall and having portions that are in register with and that extend toward said door-receiving opening, a lower trackway that is secured to said vehicle and that has part thereof disposed adjacent the bottom of said door-receiving opening, said lower trackway having an innermost wall and an outermost wall and having portions that are in register with and that extend toward said door-receiving opening, a door that is movable longitudinally of said upper and lower trackways into and out of register with said door-receiving opening, said door being movable laterally of said upper and lower trackways whenever said door is in register with said portions of said upper and lower trackways that extend toward said door-receiving opening to move into and out of a position within said door-receiving opening and flush with said wall, brackets that are secured to said door and that carry rollers which are positioned within said upper and lower trackways, said brackets fixedly holding said rollers against appreciable movement laterally of said door, said upper and lower trackways having narrow portions spaced from the door-receiving opening wherein the innermost and outermost walls of said upper and lower trackways prevent appreciable movement of said door and of said brackets and of said rollers whenever said door is out of register with said door-receiving opening, said upper trackway and said lower trackway having motion-limiting portions that are in the path of longitudinal movement of said door whenever said door is in register with said door-receiving opening and is so close to the plane of said wall of said vehicle that said door would strike said wall of said vehicle if said door were to be moved through said path of longitudinal movement, said door being movable laterally outwardly beyond said motion-limiting portions of said upper and lower trackways to permit movement of said door longitudinally of said trackways and away from said door-receiving opening without any engagement of said door with said wall of said vehicle.

15. A vehicle having a wall that defines a recessed door-receiving opening, a pad, a trackway that is secured to said vehicle and has a portion thereof disposed adjacent the bottom of said door-receiving opening, said trackway having a floor, a door in register with said door-receiving opening, pivots secured to said door and that rotatably carry rollers which can rest upon said floor of said trackway, said door being movable longitudinally into and out of register with said door-receiving opening and being movable laterally and upwardly into position within said door-receiving opening, said trackway having other portions that are in register with the first said portion and that extend toward said door-receiving opening to permit said door to move laterally of said trackway and into position within said door-receiving opening, said pad being interposed between the bottom of said door and the bottom of said door-receiving opening and being fixed relative to one of said bottoms and being engageable with the other of said bottoms, said pad acting to space said bottom of said door above said bottom of said door-receiving opening whenever said door is within said door-receiving opening, the distance of said bottom of said door and the bottoms of said rollers being less than the distance between said bottom of said door and said floor of said trackway when said door is in position within said door-receiving opening and said bottom of said door is spaced above said bottom of said door-receiving opening by said pad, said rollers being relieved of the weight of said door whenever said door is in position within said door-receiving opening, said door being raised upwardly as it is moved laterally into position within said door-receiving opening, the first said portion and said other portions of said trackway coacting to provide an area that can permit said pad to remain substantially out of engagement with said other bottom until after said door has moved substantially all the way into register with said door-receiving opening and has started to move laterally of said trackway and toward said door-receiving opening.

References Cited in the file of this patent

UNITED STATES PATENTS

| | | |
|---|---|---|
| 400,562 | Goelet | Apr. 2, 1889 |
| 967,273 | Walker | Aug. 16, 1910 |
| 1,092,108 | Keiser et al. | Mar. 31, 1914 |
| 1,503,393 | Twardowsky | July 29, 1924 |
| 1,921,051 | Traut | Aug. 8, 1933 |
| 2,119,574 | Dwyer | June 7, 1938 |